Oct. 30, 1962 G. MAKUH 3,061,772
IGNITION CAM DWELL ANGLE MEASURING
Filed April 2, 1959
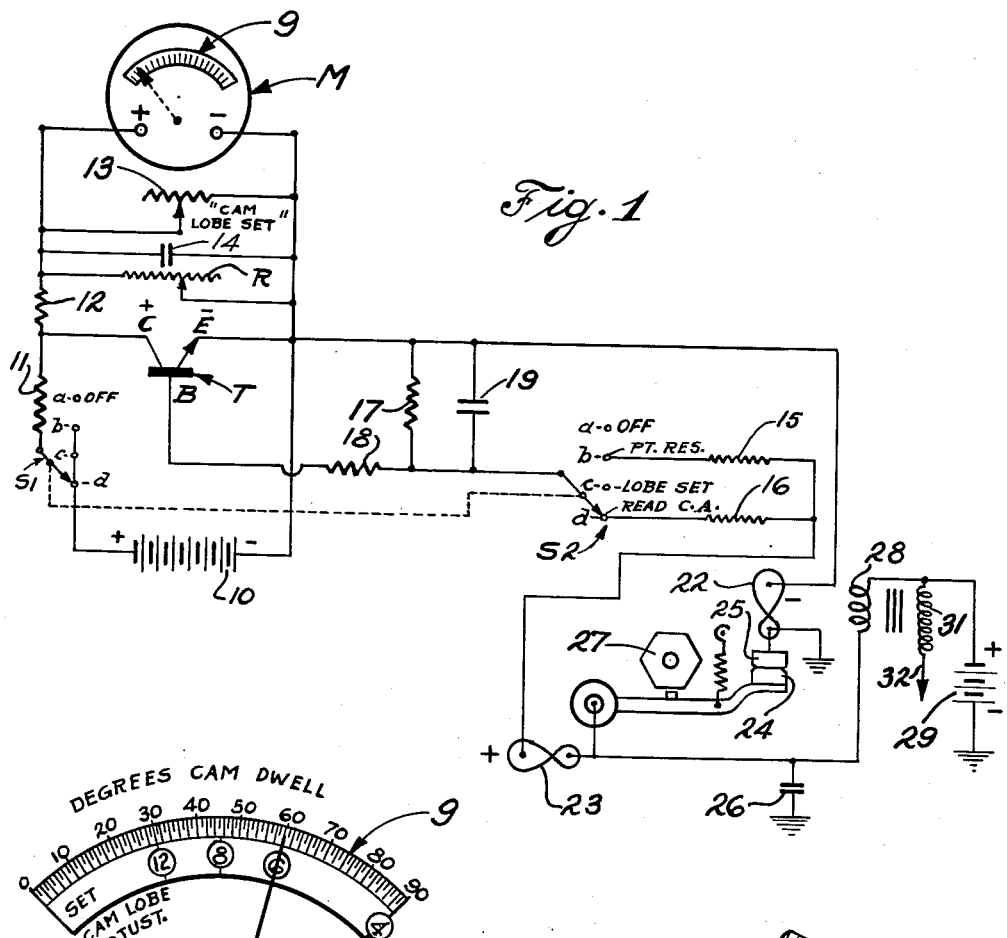
Fig. 1
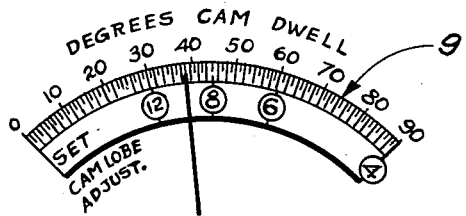
"SET" Fig. 2
"DWELL ANGLE" Fig. 3
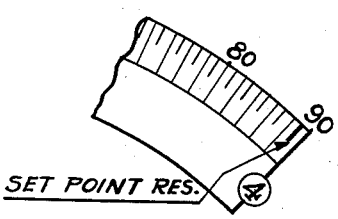
Fig. 4
INVENTOR.
GEORGE MAKUH
BY
RICHEY, McNENNY & FARRINGTON
ATTORNEYS

United States Patent Office 3,061,772
Patented Oct. 30, 1962

3,061,772
IGNITION CAM DWELL ANGLE MEASURING
George Makuh, Parma, Ohio, assignor to King Electric Equipment Company, Cleveland, Ohio, an Ohio company
Filed Apr. 2, 1959, Ser. No. 803,655
4 Claims. (Cl. 324—16)

This invention relates to electrical testing and particularly to the testing of the setting and operation of the low tension breaker points of an internal combustion engine. Such points are usually spring closed and are opened by a cam driven by the engine, either at half engine speed for a four-cycle engine, or at engine speed for a two-cycle engine. In most distributors, the number of lobes on the cam corresponds to the number of engine cylinders. The instrument of this invention is calibrated in terms of an engine wherein the number of cylinders corresponds to the number of lobes on the distributor cam.

The instrument indicates what is referred to as "dwell angle" of the distributor, this angle being the angle of cam rotation betwen lobes or successive firings, that is, the angle during which the breaker points are closed. Measurement of dwell angle gives a precise indication of breaker point gap which, among other things, affects engine timing, and measurement of this angle facilitates checking the effective or true gap of the points while the engine is running.

The instrument of the preferred embodiment of the invention includes a direct current, sensitive ammeter of the moving coil type, an internal battery, a meter shunt network that lowers the meter reading when the breaker points are open, and calibration and filter circuits. In the instrument of this invention, the dwell angle (points closed) meter reading is independent of engine speed. The meter shunt network includes a three element, solid state semi-conductor or transistor which makes possible simple and compact circuitry and permits incorporation of an internal battery of long life. The instrument requires only two clip connections to the vehicle ignition system and the instrument can be set for the desired number of engine cylinders (cam lobes) either before or after connection to the vehicle ignition system.

An important feature of the invention is that the circuit elements, that is the resistors and condensers required, are not critical in value, and normal production tolerances in these items are compensated for by a manual setting for the particular engine or cam lobe arrangement under test. The divorcing of cam angle dwell measurement from engine speed is also a valuable and important feature of the invention.

The cam dwell angle instrument of this invention can also include means providing a breaker point resistance test with a simple circuit re-arrangement that uses most of the cam angle measuring circuit and has the advantages of that circuit just described.

Another feature of the instrument is that a polarity reversing switch need not be incorporated in the instrument to accommodate the vehicle battery grounding circuit, because although the instrument employs a transistor the latter cannot be damaged by incorrect application of the two clip leads, and if such leads are crossed relative to the vehicle battery the instrument simply will not indicate normally, thereby informing the operator that he should reverse the two leads before proceeding with the test.

Still another advantage of the circuit of my invention is that, by the circuitry disclosed herein, the instrument can be relied upon to measure cam dwell angle and only cam dwell angle, in other words, other variables in performance of the vehicle engine ignition such as the presence of corroded or pitted breaker points, loose or intermittent connections, or even disconnection of a high tension lead to a spark plug will not invalidate the cam dwell angle indication. Furthermore, the cam angle dwell indication can be relied upon even though the engine is turning over at relatively low speeds such as that obtained with a slow speed idling adjustment of the carburetor.

Since the meter, battery and switch together occupy the majority of the component space in the instrument case, I can take advantage of this by adding wafers to the switch as well as a few components such as a rectifier and the like to incorporate a transistorized tachometer unit in the same instrument, such as that described and claimed separately in my co-pending application, Serial No. 739,122, filed June 2, 1958, and assigned to the King Electric Equipment Company.

The following detailed description of a preferred embodiment of the invention will enable one skilled in the art to practice the invention.

In the drawings:

FIG. 1 is a schematic diagram of the instrument of the invention connected to an engine breaker point assembly;

FIG. 2 shows the meter scale set to the number of cam lobes on a breaker cam for a six-cylinder, four-cycle engine;

FIG. 3 shows the meter scale reading the actual cam dwell angle of an engine in operation.

FIG. 4 shows the right end of the meter scale enlarged to show point resistance graduations.

Referring to the schematic of FIG. 1, the meter M has a scale 9 and the meter is shunted by a transistor T, the energy for deflecting the meter pointer being supplied by an internal battery 10 in series with the meter terminals. The battery 10 also biases the transistor T, and when the transistor is conducting, which occurs in response to a signal from the engine ignition system that is produced only when the breaker points of the distributor are open, the transistor current shunts part of the battery current from the meter thereby lowering the meter reading.

Provision of an internal battery in the instrument insures that the polarity of the transistor emitter and collector elements will always be correct regardless of the nature of vehicle battery polarity connections, and the bias voltage remains unchanged for various engine battery voltages, because reliance need not be placed upon the vehicle battery to provide a bias voltage for the transistor.

Before describing the various circuit elements of the instrument, it will be noted that two basic switches are incorporated, namely switches S1 and S2, it being understood that these switches are preferably each in the form of a switch wafer, or one side of a wafer mounted on a single shaft. The switches have four positions, "a," "b," "c," and "d," as indicated in the drawings.

Switch wafer S1 is the "Off-On" switch for the internal battery circuit of the instrument so that when it is turned to contact "a," the circuit between the battery and the meter and transistor network is opened, whereas when it is at contacts "b," "c," and "d" the transistor is biased and the meter is energized.

Switch wafer S2 is the function switch. When it is turned to contact "c" (Lobe Set) the base of the transistor is out of the circuit and the meter reading can be adjusted to match the number of lobes on the distributor cam under test, and when switched to contact "d" and the engine is running, the meter gives a cam dwell angle reading. Switch S2 also converts the instrument from a cam dwell angle measuring device when set to contact "d" to a breaker point and distributing resistance checking unit, when set to contact "b." When set to contact "a" the function switch circuit is merely opened, corresponding to position "a" of the Off-On switch S1.

The various circuit elements and their function in the instrument will now be described. In the meter network there is an internal calibration rheostat R connected across the meter and battery circuit. When the transistor is not conducting (which can be assured by disconnecting one test lead from the engine or with function switch S2 on contact "c") resistance R is adjusted to give full scale deflection of the meter, which is near the "Set Point Res." line to the right of the scale as seen in FIG. 4. This internal adjustment compensates for variations in battery voltage and for production variations in the various circuit components.

Also, in the meter network is connected a series resistor 11 between the positive internal battery terminal and the collector C of the transistor to act as a load, or current limiter for the transistor. A junction transistor T of the NPN type, wherein the collector is positively biased, is illustrated, but if a transistor of the PNP type is used, the internal battery terminals are reversed. A current limiting resistor 12 is also inserted between the battery and the meter to assure that with a given battery voltage and meter, full scale deflection of the meter cannot be dangerously exceeded.

Another shunt rheostat 13, the "Lobe Set" rheostat, shunts the meter and is adjusted to produce a normal or preselected deflection of the meter needle when the transistor is not conducting that corresponds to the number of distributor cam lobes on the distributor under test, and for this adjustment the function switch is set to contact "c" the "Lobe Set" position. When the instrument is used to measure cam dwell angle for the breaker contacts, adjustment of resistance 13 is made so that the maximum meter needle deflection indicates the selected number of cam lobes (cylinders) for the engine under test.

A condenser 14 is also connected across the meter terminals in order to smoth out or integrate the signal pulses aplied to the meter terminals, when the vehicle engine is running, so that the meter pointer assumes a relatively steady deflection as the breaker points open and close, which deflections, as will be explained, represents the distributor cam dwell angle. This condenser helps give cam dwell angle readings that are accurate even though the engine is idling at a slow speed.

The electron current flowing across the transistor base B from emitter E to its collector C is triggered by unidirectional pulses delivered from the vehicle ignition system to the base B.

The preferred circuit is that of the grounded emitter type which gives good performance as well as good amplification at low signal pulse frequencies. The base B of the shunting transistor receives unidirectional signals or pulses when switch S2 is set to the "Read Cam Angle" contact "d." These pulses are fed through a resistance voltage divider network 16, 17 which voltage signals reach the base B of the transistor through the base bias resistor 18.

Since the ignition system includes both inductive and capacitive reactances, damped high frequency oscillations are set up in the ignition (signal) circuit with each breaker point interruption. In the circuit shown, the series resistor 18 and a signal shunt condenser 19 both filter and by-pass these high frequency oscillating currents and so contribute to the steady positioning of the meter pointer during operation.

The lead from the transistor emitter E connects to a negative ground clip 22 and the base B of the transistor is functionally connected to a distributor primary terminal clip 23. The ignition system includes the usual ungrounded movable breaker point 24, the grounded fixed point 25, a shunt condenser 26 across the movable point and ground, the breaker cam 27, primary ignition coil 28, battery 29 in series therewith, ignition coil secondary 21, and high tension lead 32.

When the function switch is turned to the "Lobe Set" contact "c," the transistor base B can receive no signal pulses from the ignition system of the engine and hence is at neutral or zero potential. Under this condition the transistor acts as reverse-biased rectifier and offers maximum shunt resistance across the meter so that the meter reading is completely controlled by the settings of the calibration rheostat R and the parallel "Cam Lobe Set" rheostat 13.

When the function switch S2 is in its "Read Cam Dwell Angle" position (d), and when the engine is running, the base of the transistor is grounded when the breaker points are closed, placing hte base at zero potential and again rendering the transistor momentarily non-conducting. Thus the "points closed" condition provides minimum shunting of the meter by the transistor and hence calls for a momentary maximum reading of the meter. However, when the breaker points are opened by cam 27, the movable breaker point 25 is substantially at battery potential and a pulse is applied to the base B of the transistor, causing the transistor to conduct and partially shunt the meter, thereby lowering the meter reading. Rheostat R, the initial calibration rheostat, is adjusted so that full scale deflection of the meter is readily obtainable over the range of the "Lobe Set" rheostat 13.

In operation, the transistor is placed in its nonconducting state and current is supplied to the meter by turning the switches to contacts "c." Rheostat 13 is set to read the given number of cam lobes or engine cylinders (six, for example) which will correspond to a maximum dwell angle of 60°, as seen in FIG. 2. The import of this can be understood as follows: Assume that we have a six lobe cam 27 and that the breaker points are adjusted so that they remain closed as the cam 27 rotates. With this the points are always in a condition that corresponds to that of a 60° "dwell" state between the highest point of each cam lobe so that if the rheostat 13 is set so that the meter arbitrarily reads "6" cylinders or "60° Dwell Angle" it can be seen that if the breaker points are brought together slightly so that they are opened for a rotation of one degree (for example) by each cam lobe then there will remain a 59° arc of "points closed" or dwell angle between each cam lobe.

Now, as explained above, when the points are opened (for one degree rotation in the above example) breaker point 24 is no longer grounded and a unidirectional pulse signal is applied to the transistor base by means of the vehicle battery conducting through the ignition coil primary to the movable (ungrounded) breaker point 24 and instrument lead clip 23. Now the transistor conducts, shunts the meter from receiving full battery current, and lowers the meter reading. But in the above example, this shunting will only occur during the one degree point-open period and the meter reading will drop from its previous set maximum of 60° to the actual dwell angle of 59°. Of course this is an extremely large dwell angle and the example is only given by way of explanation. A shorter and more typical dwell angle reading for a six cylinder engine is indicated in FIG. 3. Since the signal pulses are supplied to the base of the transistor when the breaker points are open to cause the transistor to conduct, shunt the meter, and lower the dwell angle reading, this action will always occur over the same fraction of a cam revolution regardless of engine speed, and the instrument is independent of engine speed, this selective action being augmented by shunt condenser 14 which helps steady low speed operation, and by the high frequency voltage divider and filter network comprising resistors 16, 17 and 18, and condenser 19.

A typical set of values for the circuit components with an NPN transistor appears below, in Table I.

In FIG. 1 the connections for a vehicle ignition system wherein the negative terminal of the vehicle battery is grounded. Some vehicles have the positive battery terminal grounded with which the connectors of clips 22 and 23 would be reversed from that shown in FIG. 1. This causes no difficulty, however, because if the leads are connected incorrectly, the meter will merely remain in its "Lobe-Set" position on operation of the engine during the test, whereas if the leads are connected correctly, the meter will, as indicated above, present a lower cam angle reading than the pre-set reading. The leads can be marked or color-coded as usual to assist in initial correct connection by observation of the vehicle battery, but since the posts on many batteries are not clearly marked for polarity and their size differences require close observations for determination of polarity, the above characteristic of operation insures proper lead connection, even if the marking on the test leads themselves have been lost or obliterated.

Table I

| | |
|---|---|
| Meter | 0 to ½ ma. |
| Meter battery | 9 volts |
| Resistance, ohms: | |
| 10 | 300 (battery) |
| 11 | 660 |
| 12 | 6,800 |
| 13 | 3,000 |
| 15 | 150 |
| 16 | 1,000 |
| 17 | 500 |
| 18 | 1,000 |
| Condensers: | |
| 14 mfd | 250 to 1,000 |
| (This value depends upon the damping required by the meter). | |
| 19 mfd | 0.1 |

If point resistance, loose pigtail wiring, etc. are to be checked, the function switch $S_2$ is turned to contact "b" which replaces resistance 16 with the lower series resistance 15, rendering the meter more sensitive, and with one of the clips disconnected from the engine, or with the switch set on the "Lobe Set" position (C), rheostat 13 is adjusted so that the meter needle goes full scale as indicated in FIG. 4. Now with the engine not running and with the breaker points closed, if the breaker points are corroded there will be a small voltage drop across the points so that the base B of the transistor will be slightly positive from ground, causing the transistor to conduct and lower the meter reading. The "point resistance" markings are arranged to correspond to the maximum permissible voltage drop of about 0.2–0.3 volt with the ignition switch turned on. Poorly grounded distributor breaker plates, bad pigtail connections, etc. can also be located. Resistor 15 serves several functions, it protects the transistor from 12 volt vehicle batteries should the breaker points be opened with the ignition turned on, and it reduces the effect of high frequency filter condenser 19 on the breaker point condenser 26 should the engine be run during a point resistance test.

The calibration and lobe set or adjusting rheostats R and 13 respectively are shown connected shunt because they thereby function independently of battery voltage. However, series circuits could be used for these controls in the broader aspects of the invention.

Although the foregoing description is necessarily of a detailed character, in order that the invention may be completely set forth, it is to be understood that modifications may be made without departing from the scope or spirit of the invention as herein claimed.

What is claimed is:

1. An arrangement for measuring the breaker point dwell of the primary breaker circuit of the ignition system of an internal combustion engine, which system is of the type having a source of electrical energy, a primary inductance connected thereto, a set of breaker points, one of said breaker points being connected to said primary inductance and the other of said breaker points being connected to ground, and cam means driven by the engine for opening the breaker points to supply a spark for each cylinder of the engine and permitting said breaker points to close during a dwell angle whereupon current flow through the primary inductance, said dwell measuring arrangement comprising: a direct current source, an ammeter connected across said current source, a transistor connected across said current source in parallel with said ammeter, said transistor including a control electrode whose potential controls the current conduction through the transistor in parallel with the ammeter, means for connecting said control electrode of the transistor to said one breaker point so that said transistor cotnrol electrode is grounded when the breaker points are closed, thereby rendering said transistor substantially non-conductive, and so that said transistor control electrode is at a potential different from ground and determined by the potential of said one breaker point when the breaker points are open, causing said transistor to conduct current and thereby reduce the current through the ammeter, said ammeter having a scale calibrated to read breaker point dwell angle as a function of the current through the ammeter and a bypass filter connected between said connecting means and said other breaker point and operative to bypass transients from the transistor and from the meter when the breaker points open.

2. The arrangement of claim 1 wherein there is provided means for adjusting the reading of said ammeter when said transistor is non-conductive.

3. The arrangement of claim 2 wherein said adjusting means comprises adjustable resistance means connected in parallel with said ammeter.

4. The arrangement of claim 1 wherein there is provided multiple position switch means operative in one position to conect said direct current source across said ammeter and to connect said transistor control electrode to said one breaker point, said switch means being operative in a second position to connect said direct current source across said ammeter and to disconnect said transistor control electrode from said one breaker point, whereby the transistor is maintained substantially non-conducting to permit calibration of the ammeter.

References Cited in the file of this patent

UNITED STATES PATENTS

| | | |
|---|---|---|
| 2,244,717 | Lansdale | June 10, 1941 |
| 2,254,175 | Eltgroth | Aug. 26, 1941 |
| 2,425,321 | Horton | Aug. 17, 1947 |
| 2,444,014 | Williams | June 22, 1948 |
| 2,445,800 | Mortlock | July 27, 1948 |
| 2,559,849 | Covert | July 10, 1951 |
| 2,627,039 | McWilliams | Jan. 27, 1953 |
| 2,807,778 | Weidner | Sept. 24, 1957 |
| 2,908,859 | Moehring | Oct. 13, 1959 |